United States Patent [19]

Fraley

[11] Patent Number: 5,594,498
[45] Date of Patent: Jan. 14, 1997

[54] PERSONAL AUDIO/VIDEO SURVEILLANCE SYSTEM

[75] Inventor: Walter C. Fraley, Carlsbad, Calif.

[73] Assignee: SEMCO, Inc., Carlsbad, Calif.

[21] Appl. No.: 323,219

[22] Filed: Oct. 14, 1994

[51] Int. Cl.$^6$ ...................................... H04N 7/18
[52] U.S. Cl. ..................... 348/158; 348/143; 348/376; 348/375; 348/151
[58] Field of Search ................................. 348/153, 143, 348/158, 373, 374, 375, 376; 358/335

[56] References Cited

U.S. PATENT DOCUMENTS

| | | | |
|---|---|---|---|
| 3,885,090 | 5/1975 | Rosenbaum | 178/6.6 A |
| 4,214,265 | 7/1980 | Olesen | 358/93 |
| 4,281,354 | 7/1981 | Conte | 360/5 |
| 4,516,157 | 5/1985 | Campbell | 348/158 |
| 4,574,308 | 3/1986 | Gibson et al. | 358/188 |
| 4,605,959 | 8/1986 | Colbaugh | 348/158 |
| 4,606,073 | 8/1986 | Moore | 455/89 |
| 4,630,110 | 12/1986 | Cotton et al. | 358/108 |
| 4,789,904 | 12/1988 | Peterson | 358/310 |
| 4,797,736 | 1/1989 | Kloots et al. | 358/93 |
| 4,982,281 | 1/1991 | Gutierrez | 358/108 |
| 5,005,213 | 4/1991 | Hanson et al. | 455/617 |
| 5,012,335 | 4/1991 | Cohodar | 348/158 |
| 5,111,289 | 5/1992 | Lucas et al. | 358/108 |
| 5,111,290 | 5/1992 | Gutierrez | 358/108 |
| 5,266,944 | 11/1993 | Carroll et al. | 340/825.36 |
| 5,305,370 | 4/1994 | Kearns et al. | 379/45 |
| 5,347,305 | 9/1994 | Bush et al. | 348/14 |
| 5,382,943 | 1/1995 | Tanaka | 348/158 |
| 5,400,185 | 3/1995 | Scerbo, III | 348/373 |
| 5,408,330 | 4/1995 | Squicciarini et al. | 348/153 |
| 5,414,444 | 5/1995 | Britz | 348/373 |

OTHER PUBLICATIONS

Parade Magazine, p. 15, Oct. 17, 1971. "Motorists in Des Peres to be captured on police candid camera," St. Louis Globe–Democrat, Jan. 11, 1984, pp. 1 and 3.
Letter dated Dec. 13, 1983, from the city of Des Peres, Missouri, to Toman Group of St. Louis. VMI Company memorandum dated Jul. 11, 1989, including circuit board drawings dated Jul. 1983 and Sep. 1983.
Eyewitness system component specifications—undated, but may be applicable to the system described in early 1983 or 1984. "Departmental Benefits" of the Eyewitness System, by The Toman Group, Inc., undated.
Opinion in P.A.T. Co. v. Crim Tec Corporation, C.A. No. 93–CV–60191–AA (E. Dist. Mich, Jul. 14, 1994) and in Crim Tech Corporation v. P.A.T. Co., C.A. No. 92–CV–60460–AA (E. Dist. Mich. Jul. 14, 1994).
Brochures, Crim Tec Systems, Inc., undated.
Brochures, Kustom signals, Inc. undated.
Brochures, Mobile Video Products, Inc., undated.

Primary Examiner—Tommy P. Chin
Assistant Examiner—Anand Rao
Attorney, Agent, or Firm—D'Alessandro & Ritchie

[57] ABSTRACT

A personal surveillance system having a video camera and an audio microphone in a single package sufficiently small to be worn as a badge, lapel pin, or similarly small accessory. The audio/video package is coupled to a transmitter for transmitting an audio and video signal to a remote station. The remote station comprises a video cassette recorder responsive to a signal for recording that is generated on a continuous basis by the audio/video package in a signal band that is filtered before recording.

10 Claims, 10 Drawing Sheets

PERSONAL AUDIO/VIDEO SURVEILLANCE SYSTEM

BACKGROUND OF THE INVENTION

1. Field of the Invention

This invention relates to a personal surveillance system for audio and video, such as one that might be worn by or placed proximate to an individual.

2. Description of Related Art

Police work, and other work in hazardous environments, can develop into situations in which it is advantageous to make and retain a record of the environment encountered by an individual police officer, preferably a record complete with audio and video. For example, it may be valuable to make and retain a video image of an arrest, of a traffic stop, or of a search, to preserve for later use as a record of those things the officer saw or heard.

One method of the prior art has been to station a video camera on a police vehicle near the officer, to make an audio and video record of events that may be seen and heard from the vehicle. While this method appears to achieve the general goal of making and preserving a record of events, it has the drawback that many events, indeed the most critical of them, may only be effectively seen or heard directly by the officer or in the very near vicinity of the officer, and not by the camera mounted in the vehicle. This method of the prior art also has the drawback that it may require the individual officer to reorient the camera or even the entire vehicle to maintain a proper field of view for the camera, such as keeping the camera directed at the officer or another particular individual.

Accordingly, it would be advantageous to provide a personal video surveillance device that can be attached to an individual's clothing or otherwise conveniently carried by an individual.

In other situations, it can be advantageous to make and retain an audio/video record of the environment encountered by an individual, or to make and transmit an audio/video image for review by another person. For example, persons who work late at night, such as guards or store clerks, may be at risk; attack may be deterred by making a record of events, or by surveillance of their work environment by another person.

One method of the prior art has been to station a video camera in a fixed location in a public place, such as the public area of a bank. While this method appears to achieve the general goal of making a preserving a record, it has the drawback that many events, may occur out of the field of view of the camera, or at a range from or angle to the camera that precise identification of objects or persons from the video record is difficult or impossible. If the camera is provided with a wide-angle lens, events may be distorted by the angle from which they are viewed and recorded. Another drawback of the prior art is that it may be difficult, expensive, and time-consuming, to set up such a camera system.

Accordingly, it would be advantageous to provide a personal video surveillance device that can make and record a record that shows the environment as viewed by an individual, and which can be set up easily, inexpensively, and rapidly.

It may also be advantageous to make and retain a record of other environments, such as the following:

1. Work environments, where it may be advantageous to make and retain a record of work activity, such as for personnel review, quality control, or training. For example, in businesses in which public contact is important it may be advantageous to review contacts made by employees with customers.

2. Medical environments, where it may be advantageous to make and retain a record of symptoms, observations, and procedures. For example, in medical examinations, patient interviews, or surgery, it may be advantageous to make an audiovisual record.

3. Academic or business conferences, where it may be advantageous to make and retain a record of proceedings. For example, during business conferences, meetings, or presentation of academic papers, it may be advantageous to make an audiovisual record.

One method of the prior art has been to station a video camera or to provide a video conferencing system. While this method appears to achieve the general goal of making a preserving a record, it has the drawback of being obtrusive and inflexible, and may be difficult, expensive, and time-consuming, to set up.

Accordingly, it would be advantageous to provide a video surveillance device that is unobtrusive and flexible in its disposition, and which can be set up easily, inexpensively, and rapidly.

SUMMARY OF THE INVENTION

The invention provides a personal surveillance system having a video camera and a microphone in a single audio/video package sufficiently small to be worn as a badge, lapel pin, or similarly small accessory, and sufficiently small to be conveniently carried in one hand. In one aspect of the invention, the audio/video package is coupled to a separate package for a transmitter for transmitting an audio and video signal to a remote station. In a second aspect of the invention, the transmitter operates in a frequency range of about 2450 to about 2483 megahertz and with a signal bandwidth of about 20 megahertz, to provide vide a high quality video signal even in the presence of a noisy environment. In a third aspect of the invention, the remote station comprises a video cassette recorder responsive to a signal for recording that is generated on a continuous basis by the audio/video package in a signal band that is removed, such as by filtering, before recording.

DESCRIPTION OF THE PREFERRED EMBODIMENT

Elements of the Personal Surveillance System

Figure 1:
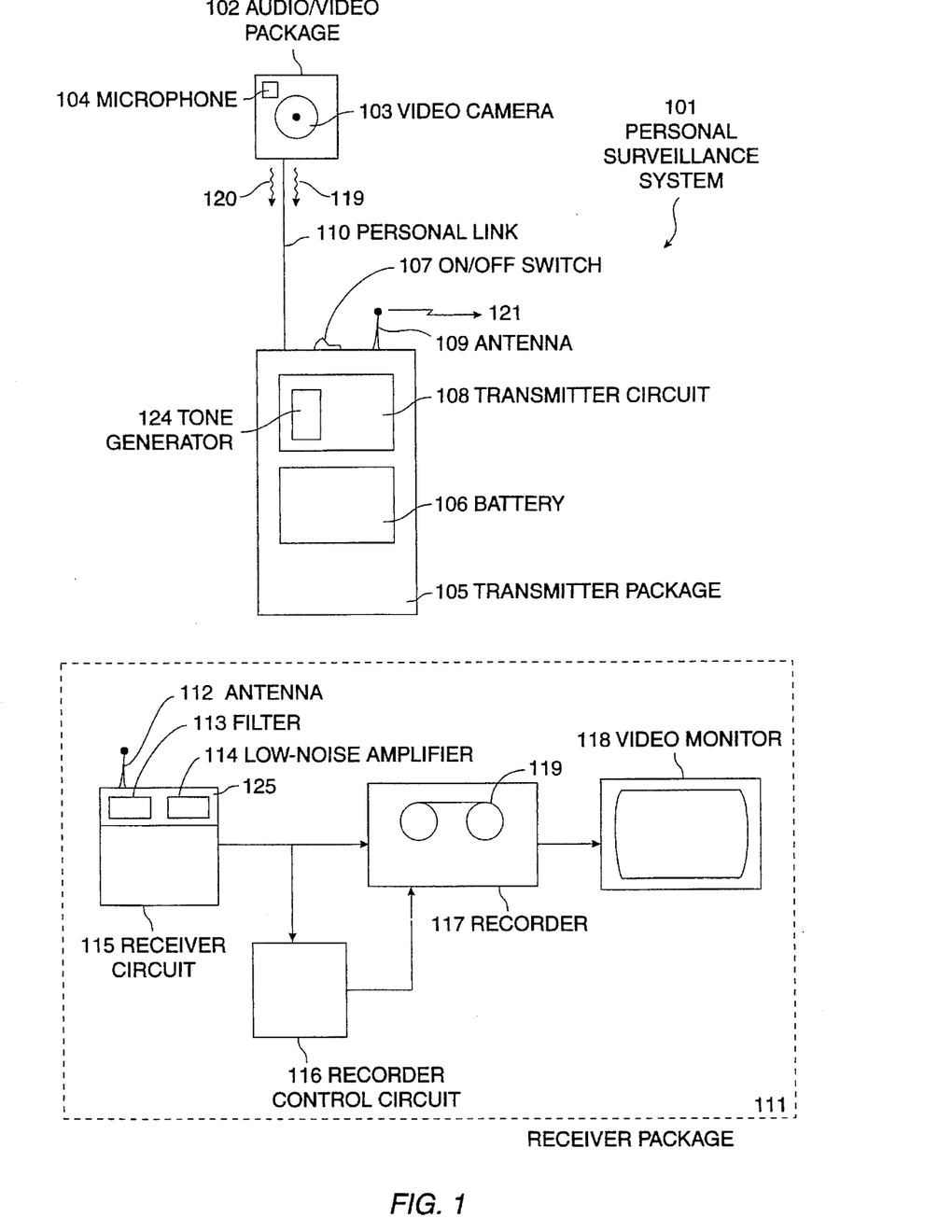
FIG. 1 shows a block diagram of elements of a personal surveillance system.

FIG. 1 shows a block diagram of elements of a personal surveillance system.

A personal surveillance system 101 comprises an audio/video package 102, comprising a video camera 103 and a microphone 104; a transmitter package 105, comprising a local battery 106, an on/off switch 107, a transmitter circuit 108 comprising a tone generator circuit 124, and a transmitter antenna 109; a personal link 110 coupling the audio/video package 102 and the transmitter package 105; and a receiver package 111, comprising a receiver antenna 112, an in-line filter 113, a low-noise amplifier 114, a receiver circuit 115, a recorder control circuit 116, a recording device 117, and a video monitor with audio 118.

Figure 2:
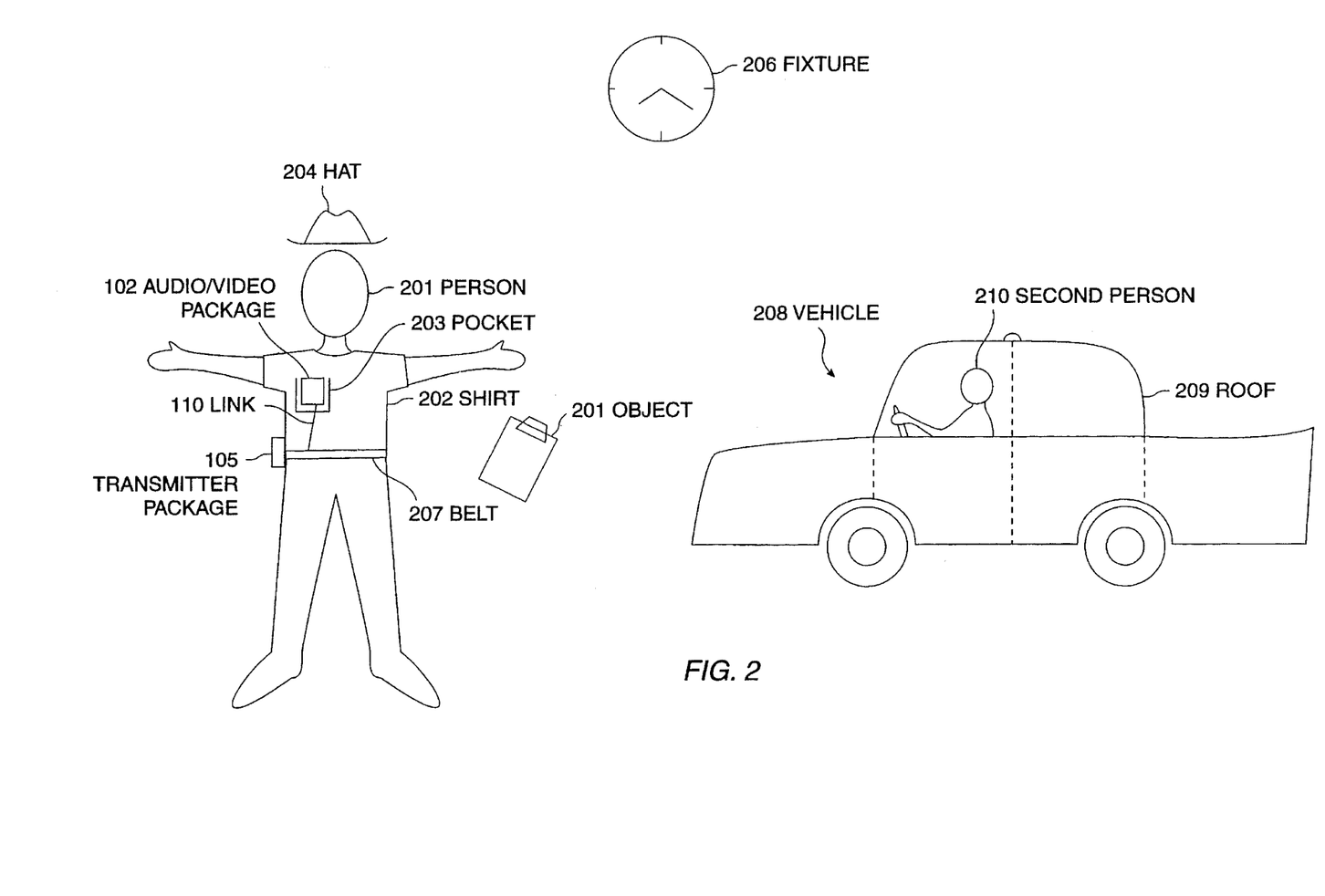
FIG. 2 shows a drawing of sample placement of elements of a personal surveillance system.

FIG. 2 shows a drawing of sample placement of elements of a personal surveillance system.

The audio/video package 102 is preferably worn by an individual 201, such as a police officer, in a convenient position such as on the individual's shirt 202 or shirt pocket 203. The video camera 103 is directed at a scene of interest, such as one viewable by the individual 201, and generates a video signal 119 for transmission, in a standard video signal format such as the NTSC format, with a peak to peak maximum amplitude of about 1 volt. The NTSC format is known in the art of video signals. The microphone 104 is disposed to receive sound in an area of interest, such as one near the individual 201, and generates an audio signal 120 for transmission, in a standard audio signal format such as the line level amplitude (1 milliwatt into 600 ohms resistance) that is known in the art of audio signals.

The audio/video package 102 may alternatively be coupled to other locations, such as to the individual's hat 204, or to a convenient object 205 being carried by or near the individual 201, such as a clipboard, a flashlight, or similar object, or to a convenient fixture 206 near the individual 201 or disposed to record the scene where the individual 201 is located, such as a location on a door or wall, a wall clock, a wall poster, or a similar object.

A personal link 110 couples the video signal 119 and the audio signal 120 from the audio/video package 102 to the transmitter package 105, for transmission to the receiver package 111, and couples power from the transmitter package 105 to the audio/video package 102. The personal link 110 comprises a first pair of conductors for coupling the video signal 119, a second pair of conductors for coupling the audio signal 120, and a third pair of conductors for coupling power from the transmitter package 105 to the audio/video package 102. In a preferred embodiment, the personal link 110 comprises a set of six copper wires sheathed in an insulated rubber housing. Such insulated housings are known in the art of electrical wiring.

The transmitter package 105 is also preferably worn by the individual 201, in a second convenient position such as on the individual's belt 207. The on/off switch 107 is coupled to the local battery 106, and controls power distribution to the audio/video package 102, by means of the personal link 110, and to the transmitter circuit 108. In a preferred embodiment, the on/off switch 107 comprises a light emitting element 205, such as a lamp or light emitting diode, that is coupled to the local battery 106 and powered on when the on/off switch 107 is in an "on" position. Lighted on/off switches are known in the art of electrical wiring.

The transmitter circuit 108 is coupled, by means of the personal link 110, to the audio/video package 102, and receives the video signal 119 and the audio signal 120 for transmission to the receiver package 111. The tone generator circuit 124 generates a pilot tone which is combined with the audio signal 120 for transmission to the receiver package 111, to control the recording mode of the recording device 117. The transmitter circuit 108 generates a modulated audio/video waveform 121, which it couples to the transmitter antenna 109 for transmission to the receiver package 111.

The receiver package 111 is preferably disposed in the vicinity of the transmitter package 105, for better reception, although there is no specific requirement for the receiver package 111 to be disposed in any specific location. In a preferred embodiment, the receiver package 111 is disposed on a nearby vehicle 208, such as a police vehicle. In such an embodiment, the receiver antenna 112 is disposed on the roof 209 of the vehicle 208, although it may alternatively be disposed on the hood, on the trunk, or on a door or window of the vehicle 208.

The receiver antenna 112 is coupled to an in-line filter 113, a low-noise amplifier 114, and a receiver circuit 115, which receives the modulated audio/video waveform 121 and demodulates it to produce a received audio signal 122 and a received video signal 123. The received audio signal 122 and the received video signal 123 are coupled to a recorder control circuit 116 and a recording device 117, and may also be coupled to a monitor with audio 118. The recording device 117 comprises a recording medium 119 and is preferably disposed in a relatively secure location so that the recording medium 119 cannot be easily altered or damaged. In a preferred embodiment, the monitor with audio 118 is disposed where the monitor with audio 118 can be viewed and heard by a second individual 210, such as a backup police officer.

The Audio/Video Package

Figure 3:
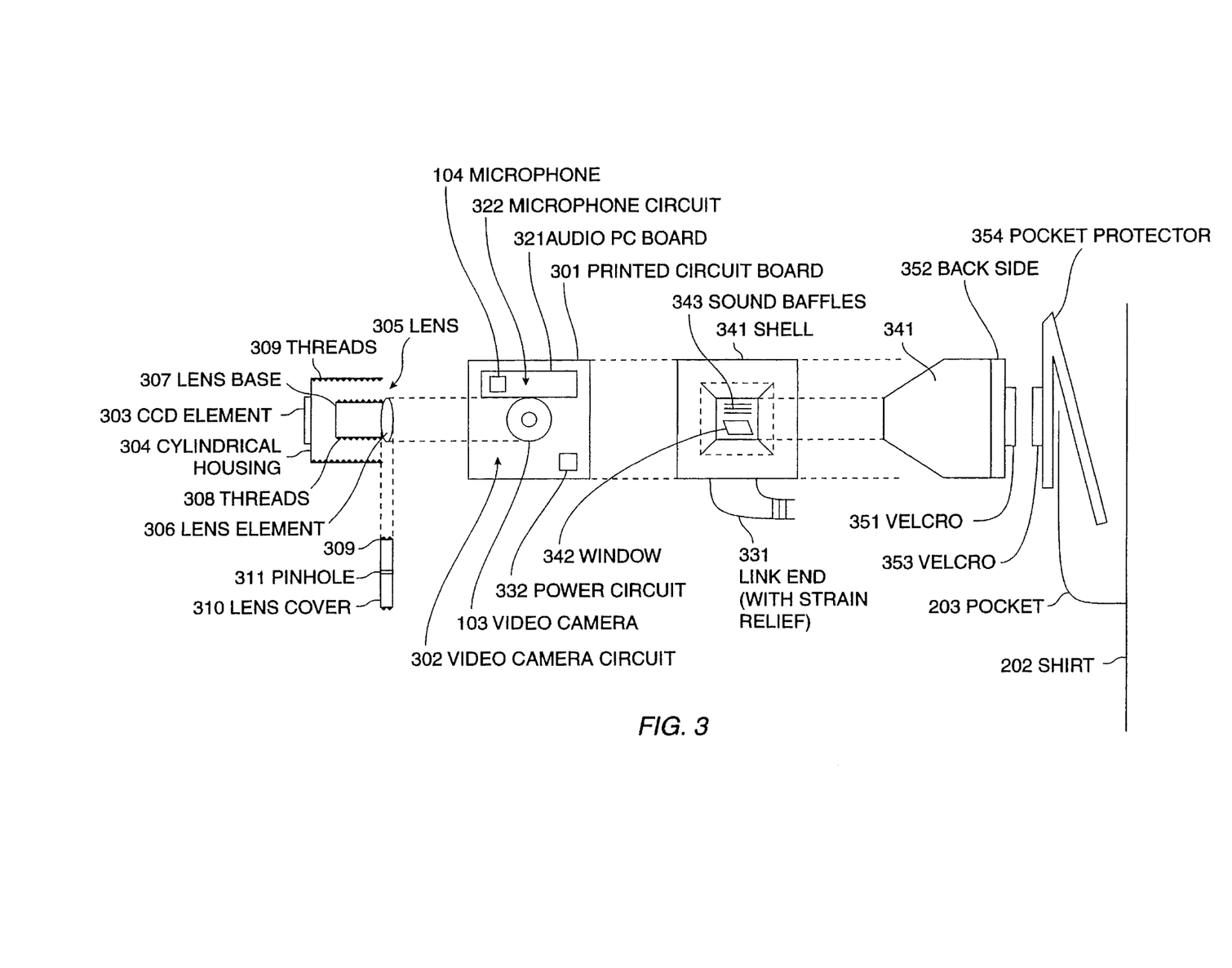
FIG. 3 shows a drawing of an audio/video package for a personal surveillance system.

FIG. 3 shows a drawing of an audio/video package for a personal surveillance system.

The audio/video package 102 comprises a video printed circuit board 301 approximately 1.75 inches×1.75 inches in size, having a video camera circuit 302 and having the video camera 103 coupled thereto. The video camera 103 comprises a CCD element 303 coupled to the video printed circuit board 301 and the video camera circuit 302, a cylindrical housing 304 surrounding the CCD element 303 and preventing stray light from striking the CCD element 303, and a lens 305.

In a preferred embodiment, the video camera 103 comprises the VBC-460AW product made by Pacific of Japan. In a preferred embodiment, the CCD element 303 may be obtained as part of the video camera product.

The lens 305 is coupled to the cylindrical housing 304 and comprises a lens assembly, having a lens element 306 mounted on a lens base 307. The lens base 307 has a set of screw threads 308, mated to a set of screw threads 309 on the cylindrical housing 304. The lens element 306 may comprise either a refractive lens with an electronic iris, or a pinhole lens; the pinhole lens is formed from a lens cover 310 with a pinhole 311 bored therethrough. The lens assembly is disposed so the individual 201 wearing the audio/video package 102 may adjust the focus of the lens 305 by twisting it on the screw threads 308 and 309, thus moving the lens base 307 toward or away from the CCD element 303. In a preferred embodiment, the lens 305 has a focal length of infinity for most such settings. Alternatively, the individual 201 wearing the audio/video package 102 may replace one lens assembly with another.

In a preferred embodiment, the lens 305 may be obtained as part of the video camera product, and other lenses may be obtained from the same source.

The audio/video package 102 also comprises an audio printed circuit board 321 approximately 1 inch×0.50 inches in size, having a microphone circuit 322 and having the microphone 104 coupled thereto. Alternatively, components of the audio printed circuit board 321 may be integrated on the video printed circuit board 301.

The personal link 110 is disposed with one end 331 coupled to the video printed circuit board 301. Two connectors are coupled from the video camera 103, by means of the video printed circuit board 301, to the personal link 110. Two connectors are coupled from the microphone 104, by means of the audio circuit board 321, to the personal link 110. Two connectors are coupled from the personal link 110 to a power circuit 332 on the video printed circuit board 301. In a preferred embodiment, the power circuit 332 receives a +12 volt signal and a ground signal from the personal link 110, and regulates that voltage down to about +5 volts for operation of the video camera circuit 302 and the microphone circuit 322.

The audio/video package 102 comprises a protective shell 341, shaped so that no sharp corners protrude and preferably made of injection molded hard plastic. The protective shell 341 comprises a transparent window 342 for the video camera 103, preferably made from clear plastic, and a set of sound baffles 343 for the microphone 104, disposed in a forward part of the protective shell 341.

In a preferred embodiment, the protective shell 341 is made from the polycarbonate plastic product made by Express Systems of Temecula, Calif.

In a preferred embodiment, the transparent window 342 is made from the polycarbonate plastic product made by Express Systems of Temecula, Calif.

The audio/video package 102 has a velcro pad 351 (i.e., one half of a woven hook and loop combination), or a similar coupling such as a nonpermanent glue or putty, glued to a back side 352. The velcro pad 351 is coupled in the ordinary manner of velcro (i.e., by attachment through slight pressure), to a mated velcro pad 353 (i.e., the other half of a woven hook and loop combination) attached to the individual's clothing, such as the individual's shirt pocket 203. In a preferred embodiment, the mated velcro pad 353 is riveted or sewn to a pocket protector 354, which is shaped to envelop the individual's shirt pocket 203 and preferably made from a soft plastic.

In a preferred embodiment, the velcro pad 351 comprises the 191051/190984 "Velcro" product.

A strain relief 331 is coupled to the protective shell 341 and encloses the personal link 110. In a preferred embodiment, the personal link 110 is slipped inside the individual's shirt 202 at a button line or other point of entry, and coupled to the transmitter package 105 at the individual's belt 207.

In a preferred embodiment, the strain relief 331 comprises the neoprene plastic product made by Express Systems of Temecula, Calif.

The Transmitter Package

Figure 4:
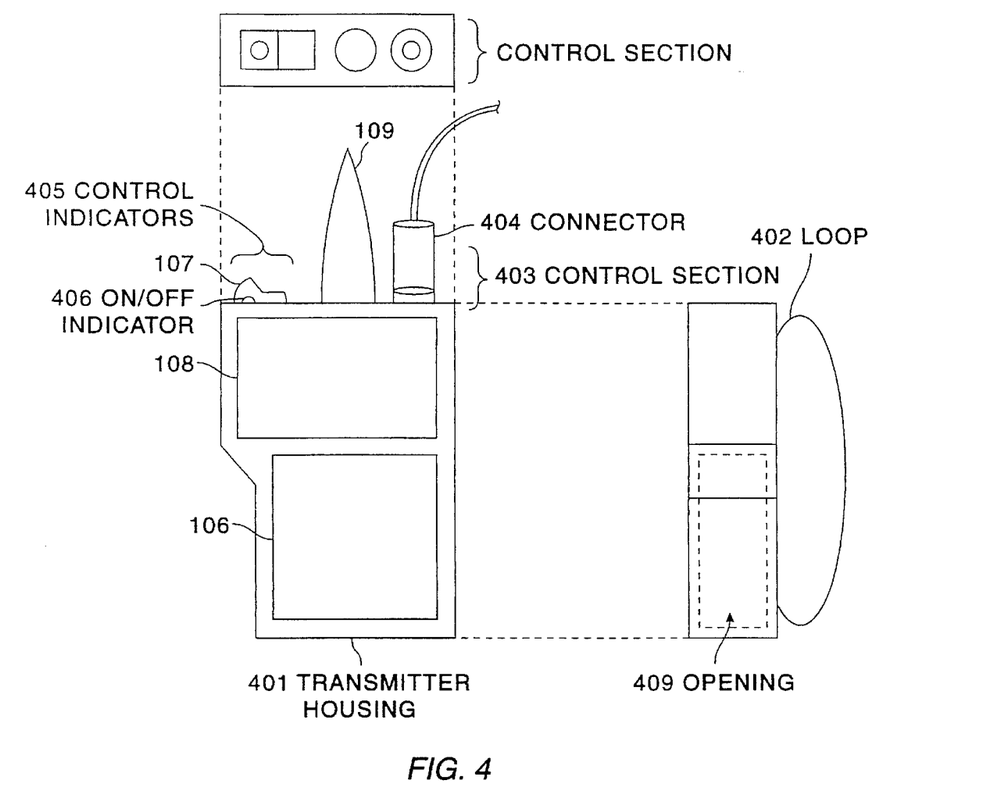
FIG. 4 shows a drawing of a transmitter package for a personal surveillance system.

FIG. 4 shows a drawing of a transmitter package for personal surveillance system.

The transmitter package 105 comprises a transmitter housing 401 for holding the local battery 106 and the transmitter circuit 108. The transmitter housing 401 comprises a loop 402, or a clip, buckle, or other device, for disposing the transmitter housing 401 on the individual's belt 207. In a preferred embodiment, the transmitter antenna 109 is coupled to the transmitter housing 401.

In a preferred embodiment, the transmitter antenna 109 is a 2 db gain omnidirectional antenna, and comprises the AND-C-107 product made by M/A-COM.

A control section 403 is disposed at a top portion of the transmitter housing 401, or another portion of the transmitter housing easily available to the individual 201 wearing the audio/video package 102. The control section 403 comprises the on/off switch 107, a connector 404 for coupling the personal link 110, and a set of control indicators 405.

In a preferred embodiment, the connector 404 is a six-pin snap-on connector, and comprises the SR30-10PE-6P product made by Hirose of Japan.

The local battery 106 is coupled to the connector 404, for supplying power to the audio/video package 102.

In a preferred embodiment, the local battery 106 comprises an integrated battery package comprising either a sealed lead-acid or nickel-cadmium battery and supplying about 12 volts DC power, and comprises either the NPO.8-12 lead-acid battery made by Yuasa of Japan, or a nickel-cadmium battery made by Alexander Batteries of Escondido, Calif.

The control indicators 405 comprise an on/off indicator 406 coupled to the on/off switch 107, as noted herein. The control indicators 405 could also comprise other indicators, such as a "low battery" indicator coupled to the local battery 106 and disposed to indicate when the local battery 106 should be recharged or replaced. In a preferred embodiment, the transmitter housing 401 comprises an opening 409 for replacing the local battery 106.

Transmitter Circuit

Figure 5A:
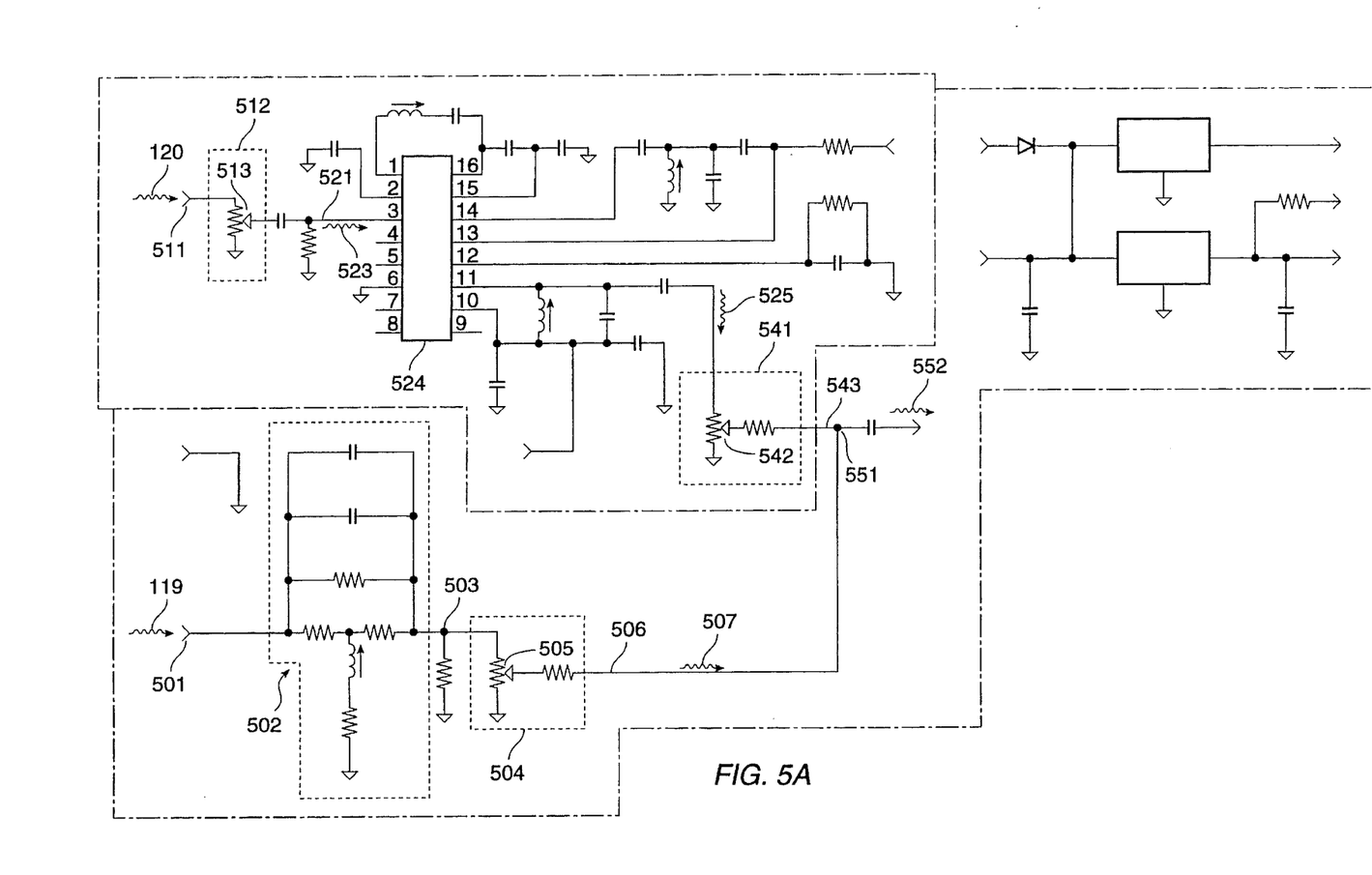
FIGS. 5A, 5B, and 5C (collectively called FIG. 5 herein) show a circuit diagram of a transmitter for a personal surveillance system.
Figure 5B:
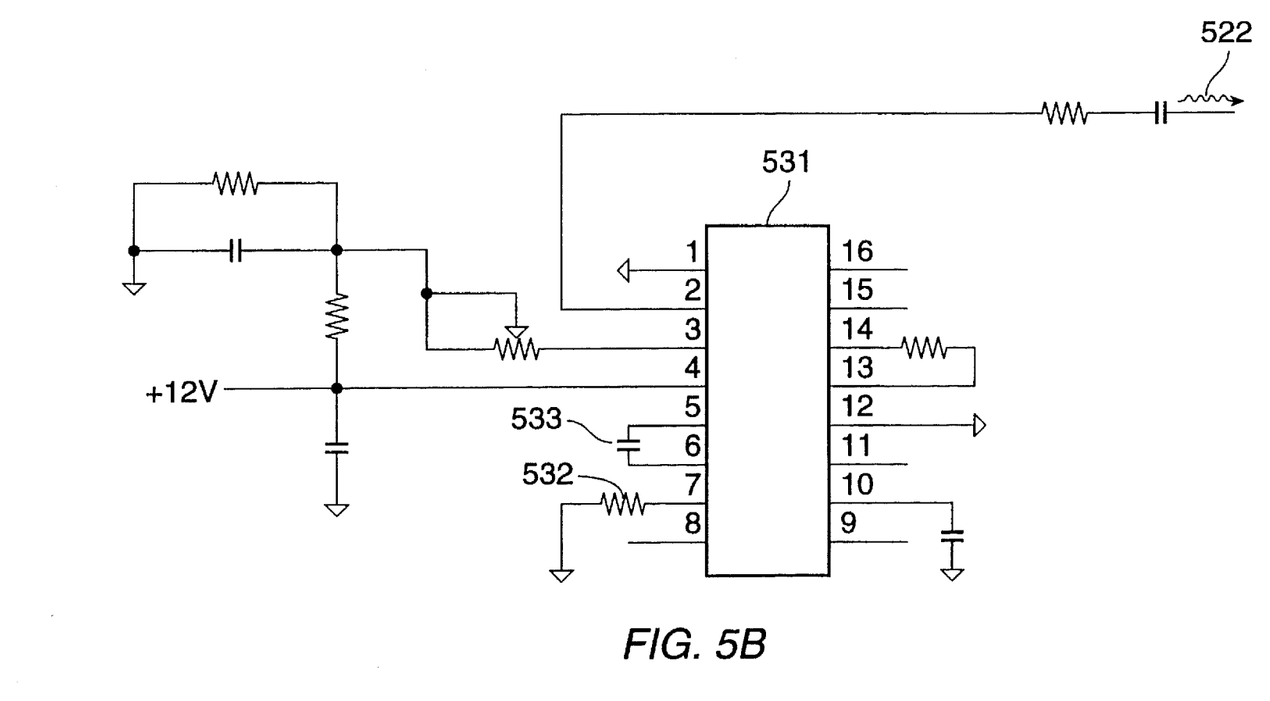
Figure 5C:
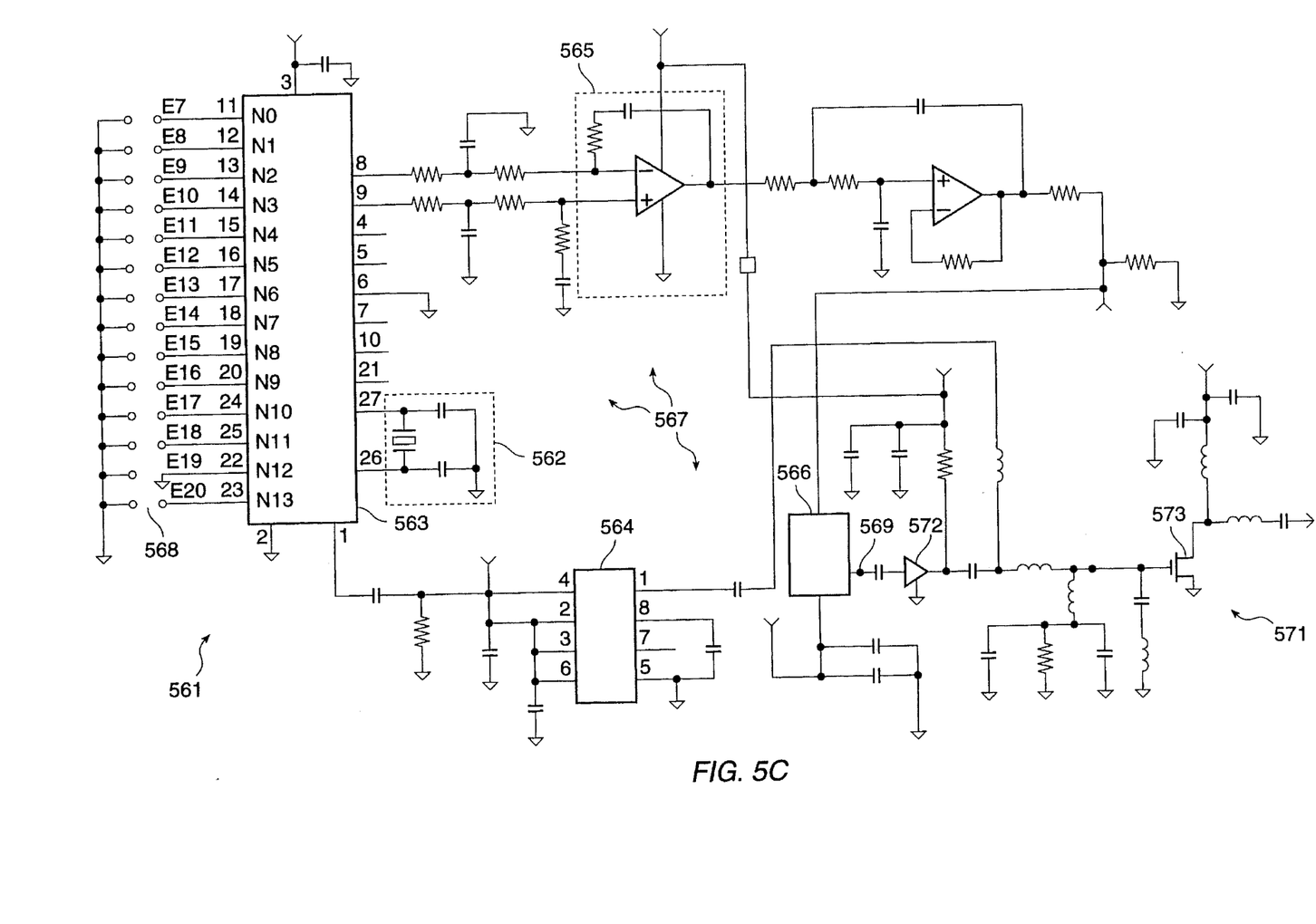

FIG. 5 shows a circuit diagram of a transmitter for a personal surveillance system.

The transmitter circuit 108 receives the video signal 119 generated by the video camera 103, subjects that video signal 119 to preemphasis and frequency deviation adjustment, and modulates the modified video signal onto an audio/video carrier. The transmitter circuit 108 also receives the audio signal 120 generated by the microphone 104, modifies that audio signal 120 by injecting a control signal for the receiver package 111 to produce a modified audio signal, and frequency modulates (FM) the modified audio signal onto a subcarrier of an audio/video signal. In a preferred embodiment, the control signal comprises a ten kilohertz pilot tone, generated by a sine wave generator and injected into the audio signal by summing.

The video signal 119 generated by the video camera 103 is coupled to the transmitter circuit 108 at a video input node 501. The video input node 501 is coupled to a preemphasis network 502. The preemphasis network 502 subjects the video signal 119 to preemphasis, by amplifying relatively high frequency elements of the video signal 119 to a greater degree than relatively low frequency elements of the video signal. Preemphasis of video signals for transmission is known in the art.

In a preferred embodiment, the preemphasis network 502 subjects the video signal 119 to a preemphasis as designated by the NTSC 525 line standard.

An output node 503 of the preemphasis network 502 is coupled to a video deviation adjustment network 504, comprising a potentiometer 505. This potentiometer 505 adjusts the deviation of the video signal from its centerpoint after modulation onto a video carrier. In a preferred embodiment, the potentiometer 505 is not available for adjustment by the individual 201 carrying the transmitter package 105, and the potentiometer 505 is set to a peak deviation of about 4 megahertz for each 1 volt peak-to-peak input at 761 kilohertz input frequency. An output node 506 of the potentiometer 505 supplies a preemphasized video signal 507.

The audio signal 120 generated by the microphone 104 is coupled to the transmitter circuit 108 at an audio input node 511. The node 511 is coupled to an audio deviation adjustment network 512, comprising a potentiometer 513. The potentiometer 513 adjusts the deviation of the subcarrier onto which the modified audio signal is to be modulated. In a preferred embodiment, the potentiometer 513 is not available for adjustment by the individual 201 carrying the transmitter package 105, and the potentiometer 513 is set to a peak deviation of about 75 kilohertz.

An output of the audio deviation adjustment network 512 is coupled to a summing node 521, where a control signal 522 is injected into the audio signal 120, by summing the two, to produce a modified audio signal 523. The summing node 521 is coupled to a subcarrier generator circuit 524, which frequency modulates (FM) the modified audio signal 523 to create an audio FM signal 525 with a peak to peak deviation responsive to that set by the audio deviation adjustment network 512. In a preferred embodiment, the subcarrier generator circuit 524 comprises a narrowband FM generator like that found in many cordless telephones.

In a preferred embodiment, the subcarrier generator circuit 524 comprises the MC2833 product made by Motorola.

The control signal 522 comprises a ten kilohertz tone and is generated by a waveform generator 531. In a preferred embodiment, the waveform generator 531 comprises a sine wave generator circuit, coupled to components for setting parameters of the waveform generator.

In a preferred embodiment, the sine wave generator comprises the XR-2206 product made by Exar, and the components for setting parameters comprise a 10K ohm resistor 532 and a 0.01 microfarad capacitor 533.

The audio FM signal 525 is coupled to a subcarrier injection level adjustment circuit 541, comprising a potentiometer 542. The potentiometer 542 adjusts the deviation of a subcarrier onto which the audio FM signal 525 is to be modulated. In a preferred embodiment, the potentiometer 542 is not available for adjustment by the individual 201 carrying the transmitter package 105, and the potentiometer 542 is set to a subcarrier frequency of about 6.8 megahertz.

An output node 543 of the subcarrier injection level adjustment circuit 541 is coupled to a summing node 551, where the audio FM signal 525 is injected into the preemphasized video signal 507, by summing, to produce an audio/video signal 552.

The audio/video signal 552 is coupled to a frequency synthesizer circuit 561, which modulates an audio/video carrier to produce the modulated audio/video waveform 121. The frequency synthesizer circuit 561 comprises a reference frequency generator 562, a frequency divider 563 and a further second frequency divider 564, a comparator 565 comprising an operational amplifier configured as a pulse output comparator, and a voltage controll oscillator 566, all configured to form a phase locked loop 567. Phase locked loops are known in the art of signal processing.

In a preferred embodiment, the frequency synthesizer circuit 561 comprises the MC145151 FN2 product made by Motorola.

In a preferred embodiment, the reference frequency generator 562 comprises a crystal oscillator set to a reference frequency of 16.0000 megahertz.

In a preferred embodiment, the frequency divider 563 comprises the MB510 product made by Fujitsu, and is configured with a set of jumpers 568 or other circuits to modulate the audio/video signal 552 onto an audio/video carrier with a carrier frequency in the range of about 2450 to 2483 megahertz, such as for example 2460 megahertz. It has been found by the inventor that this frequency range is superior to that of prior art personal surveillance video systems, which typically operate with a carrier frequency in the range of about 900 to 928 megahertz. The higher frequency range has been found to produce fewer problems with extraneous noise and reliable reception, even though multipath problems and other problems would in theory be exacerbated.

In a preferred embodiment, the voltage controlled oscillator 566 comprises the V800MC03 product made by Z-Com.

An output node 569 of the frequency synthesizer 561 couples the modulated audio/video waveform 121 to a transmission amplifier 571. The transmission amplifier 571 comprises a monolithic microwave integrated circuit (MMIC) 572, coupled to a GaAs FET transistor 573 configured as a power amplifier, which amplifies the modulated audio/video waveform 121 to 0.25 watt. The amplified modulated audio/video waveform 121 is in turn coupled to the transmitter antenna 109. Configuration of MMICs and GaAs FETs is known in the art of power amplifiers.

In a preferred embodiment, the MMIC 572 comprises the MSA0835 product made by Hewlett-Packard.

In a preferred embodiment, the GaAs FET transistor 573 comprises the FXS52WF product made by Fujitsu.

Receiver Antenna

Figure 6:
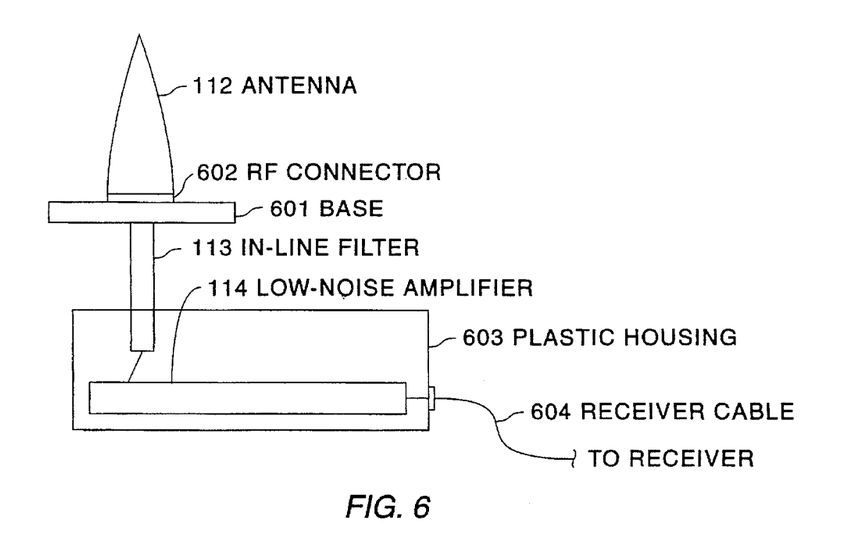
FIG. 6 shows a drawing of a receiver antenna subsystem for a personal surveillance system.

FIG. 6 shows a drawing of a receiver antenna subsystem for a personal surveillance system.

A base 601 is disposed to physically couple the receiver antenna 112 to its preferred location. In a preferred embodiment, the base 601 comprises a solid object that may be bolted to the vehicle 208. Alternatively, the base 601 may comprise a magnet that may be affixed to a metallic portion of the vehicle 208, such as a roof or door.

The antenna 112 is coupled, by means of an RF connector 602, to the in-line filter 113 and the low-noise amplifier 114. The low-noise amplifier 114 is preferably disposed in a plastic housing 603. The in-line filter 113 and the low-noise amplifier 114 amplify the modulated audio/video waveform 121 from the strength it is received at the antenna 112, preferably by use of a MMIC. The low-noise amplifier 114 is in turn coupled, by means of a receiver cable 604, to the receiver circuit 115.

The receiver cable 604 comprises a coaxial cable; it couples power from the receiver circuit 115 to the in-line filter 113 and low-noise amplifier 114, and couples the modulated audio/video waveform 121, after amplification by the low-noise amplifier 114, to the receiver circuit 115.

Receiver Circuit

Figure 7A:
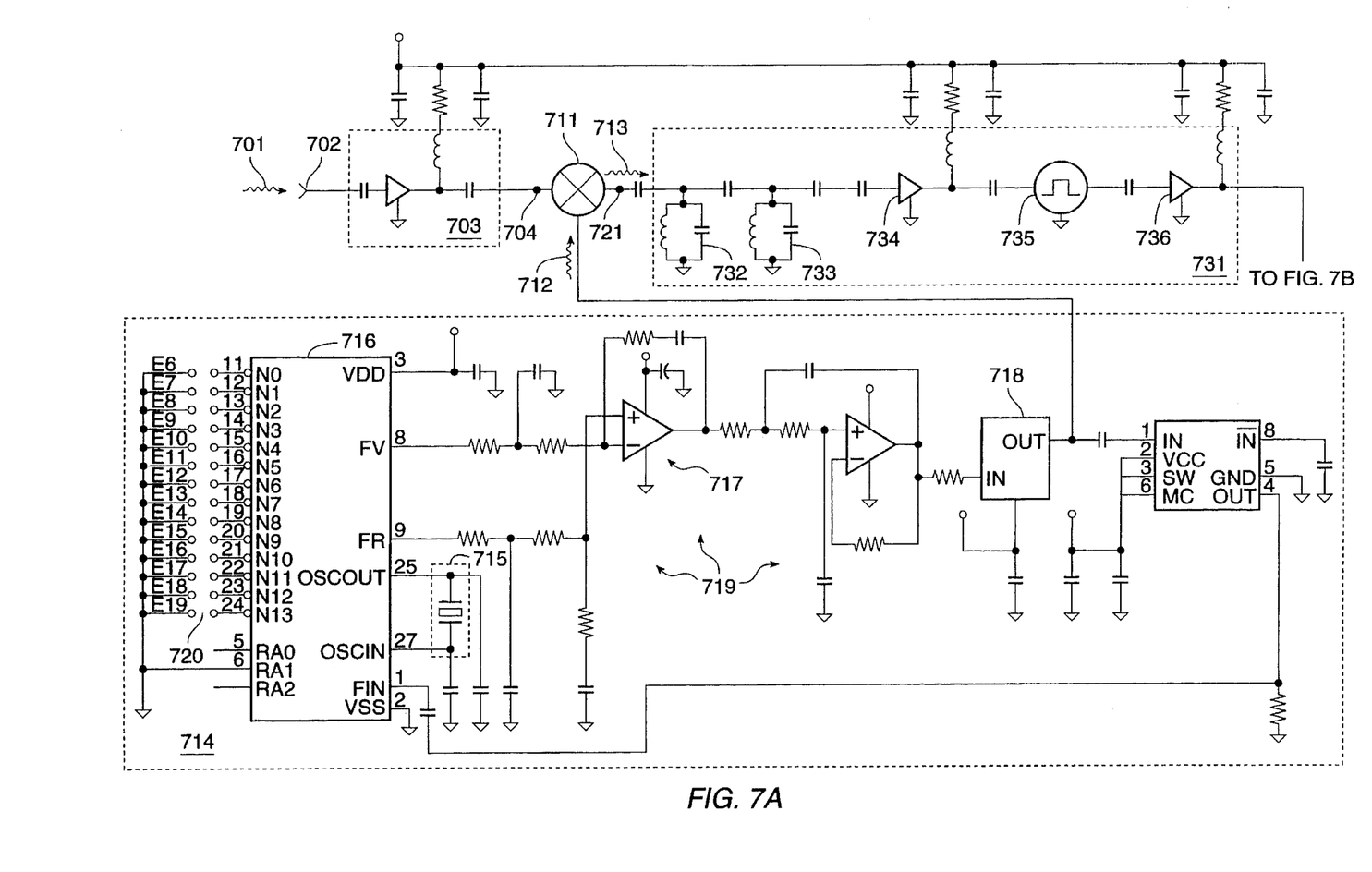
FIG. 7 shows a circuit diagram of a receiver for a personal surveillance system.
Figure 7B:
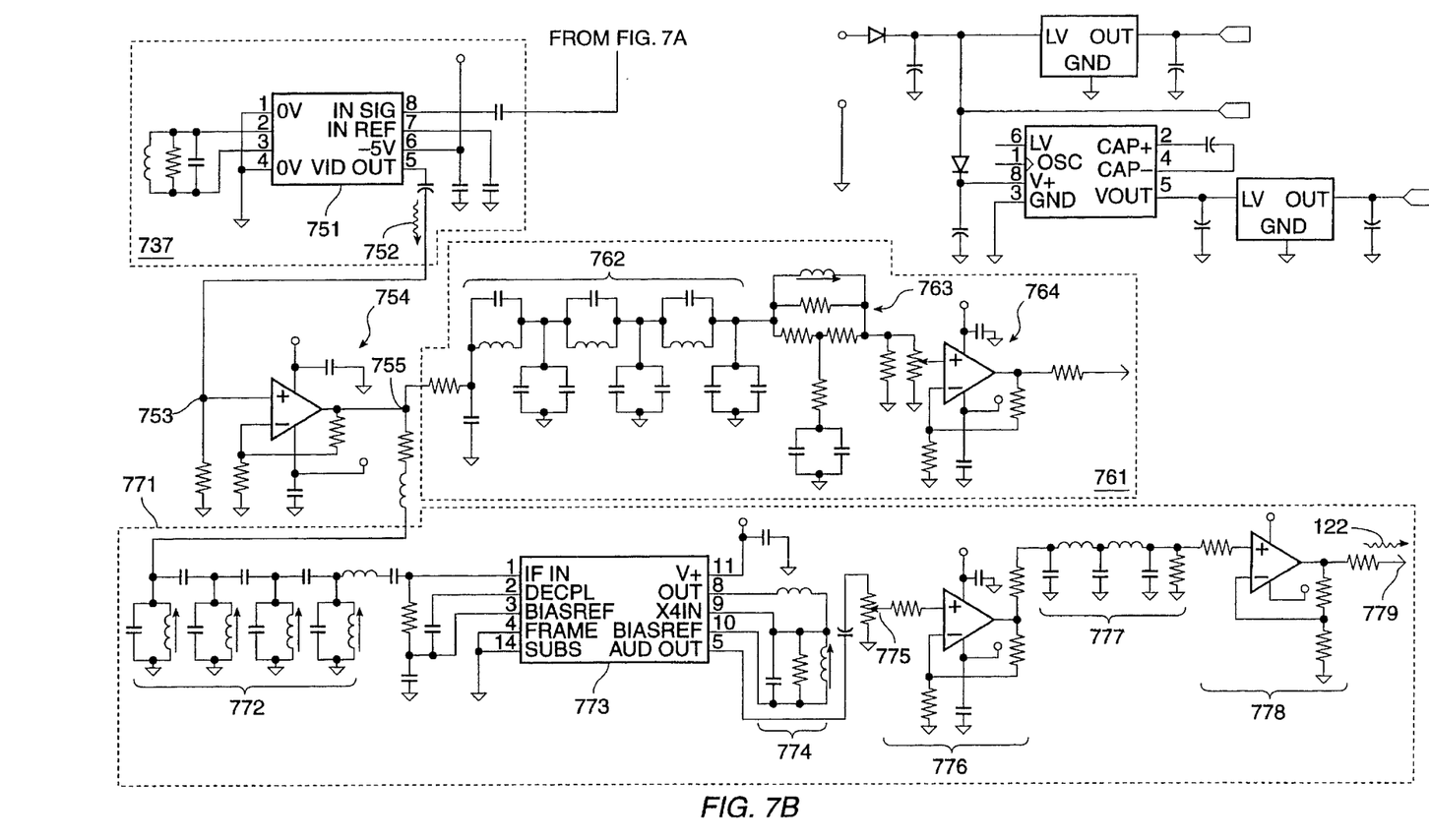

FIG. 7 shows a circuit diagram of a receiver for a personal surveillance system.

A received audio/video waveform 701 (the modulated audio/video waveform 121 as received by the antenna wire 602 and amplified by the receiver filter-amplifier 607) is coupled to the receiver circuit 115 at a receiver input node 702. The receiver input node 702 is coupled to a receiver input amplifier 703, comprising a MMIC amplifier configured as an RF amplifier.

An output node 704 of the receiver input amplifier 703 is coupled to a mixer 711, which multiplies the amplified received audio/video waveform 701 by a local oscillator 712 to produce an IF signal 713. The local oscillator 712 is generated by a frequency synthesizer 714, which comprises a reference frequency generator 715, a frequency divider 716, a comparator 717 comprising an operational amplifier configured as a pulse output comparator, and a voltage controlled oscillator 718, all configured to form a phase locked loop 719, similar to the frequency synthesizer circuit 561.

In a preferred embodiment, the reference frequency generator 715 comprises a crystal oscillator set to a reference frequency of 16.0000 megahertz.

In a preferred embodiment, the frequency divider 716 comprises the MB510 product made by Fujitsu, and is configured with a set of jumpers 720 or other circuits to produce a local oscillator with a frequency in the range of about 1980 megahertz.

In a preferred embodiment, the voltage controlled oscillator 718 comprises the V610ME01 product made by Z-Com.

The IF signal 713, at an output node 721 of the mixer 711, is coupled to an IF circuit 731, which filters the IF signal 713. The IF circuit 731 comprises the following components coupled to the output node 721 in sequence: a first out-of-band filter 732 and a second out-of-band filter 733 for removing components outside the expected frequency band of the modulated audio/video waveform 121, a first IF amplifier 734, a SAW filter 735, a second IF amplifier 736, and a frequency discriminator 737 for demodulating the IF signal 713.

In a preferred embodiment, the SAW filter 735 is tuned to a center frequency of about 479 megahertz and with a band pass of about 10 megahertz to either side thereof. In a preferred embodiment, the SAW filter 735 comprises the B39481-B611-B210 product made by Siemens.

The frequency discriminator 737 comprises a quadrature detector 751. The quadrature detector 751 divides the IF signal 713 by four, to produce a received baseband signal 752. An output node 753 of the quadrature detector 751 is coupled to a video amplifier 754, which comprises an operational amplifier configured as an amplifier.

In a preferred embodiment, the quadrature detector 751 comprises the SP1454 product made by Plessey of the United Kingdom.

An output node 755 of the video amplifier 754 is coupled to a video circuit 761 to produce a received video signal 123, and to an audio filter/discriminator circuit 771 to produce a received audio signal 122.

The video circuit 761 comprises a video low pass filter 762, a video deemphasis network 763, and a video amplifier 764. The video low pass filter 762 removes frequency components outside the range of video signals (4.5 megahertz for NTSC video signals), and comprises a set of capacitors and inductors configured as an elliptical filter. The video deemphasis network 763 inverts the effect of the preemphasis network 502, by passing relatively low frequency elements to a greater degree than relatively high frequency elements. Deemphasis of video signals for transmission is known in the art. The receiver video amplifier 764 comprises an operational amplifier configured as an amplifier.

The audio decoder circuit 771 comprises an audio band pass filter 772, a quadrature FM discriminator 773 and its tuner 774, a volume adjustment circuit 775, a first audio amplifier 776, an audio low pass filter 777, and a second audio amplifier 778. The audio band pass filter 772 comprises a set of capacitors and inductors configured as a Chebyshev filter with a center frequency of about 6.8 megahertz, the same as the frequency for injection of the audio subcarrier. The volume adjustment circuit 775 comprises a potentiometer. The first audio amplifier 776 and the second audio amplifier 778 each comprise an operational amplifier configured as an amplifier. The audio low pass filter 777 comprises a set of capacitors and inductors configured as an LC filter with a rolloff frequency of about 15 kilohertz.

Recorder Control Circuit

Figure 8:
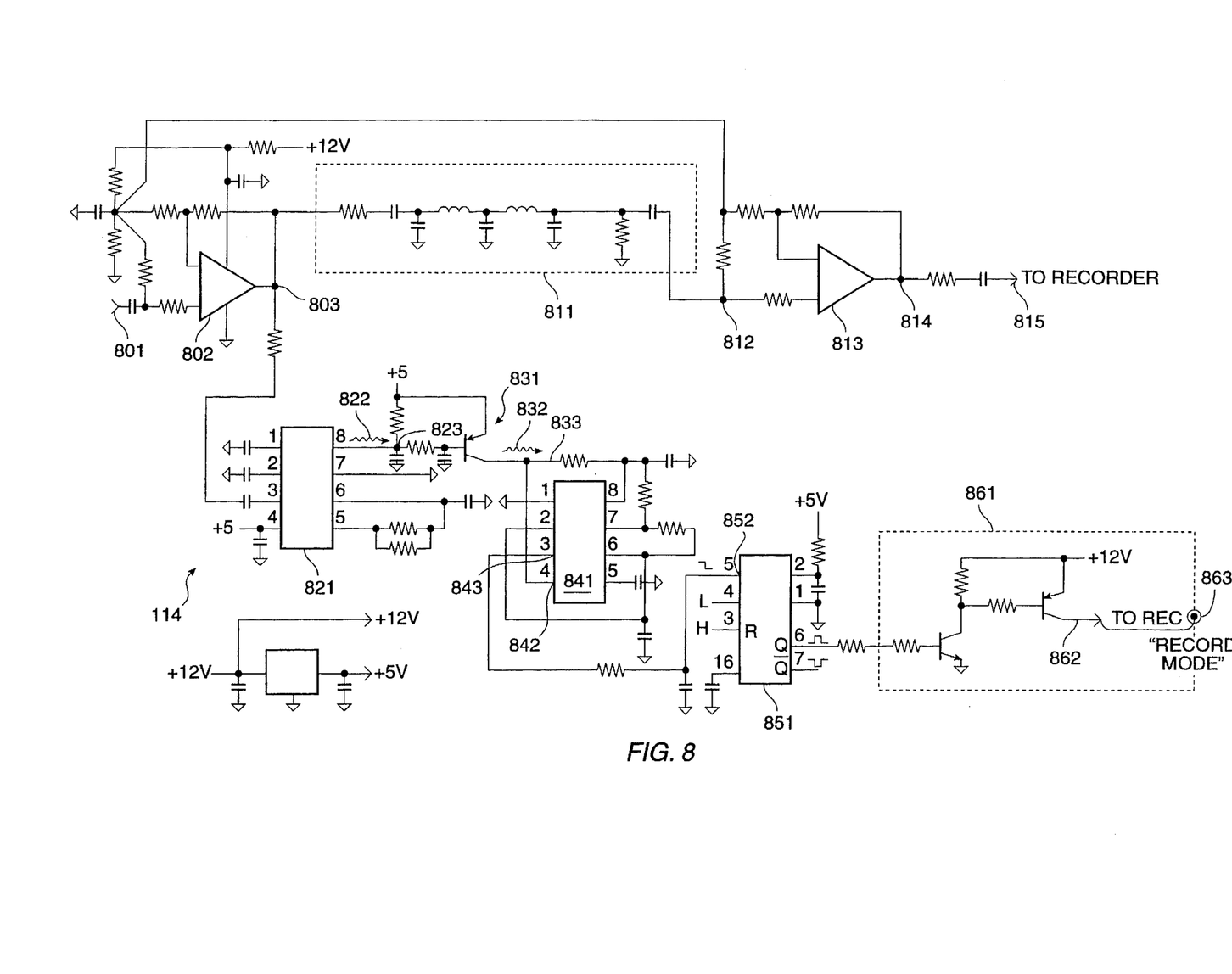
FIG. 8 shows a circuit diagram of a recorder control circuit for a personal surveillance system.

FIG. 8 shows a circuit diagram of a recorder control circuit for a personal surveillance system.

A received audio signal 122 at an output node 779 of the audio decoder circuit 771, is coupled to a recorder control circuit 116 at a recorder control input node 801. The recorder control input node 801 is coupled to a first recorder amplifier 802, comprising an operational amplifier configured as an amplifier.

An output node 803 of the first recorder amplifier 802 is coupled to a recorder low pass filter 811, which removes the control signal 522 (preferably a ten kilohertz tone) by removing that frequency component. An output node 812 of the recorder low pass filter is coupled to a second recorder amplifier 813, comprising an operational amplifier configured as an amplifier. An output node 814 of the second recorder amplifier 813 is coupled to an "AUDIO IN" input 815 of the recording device 117, which preferably comprises a video cassette recorder.

The output node 803 of the first recorder amplifier 802 is also coupled to a tone detector 821, which detects the pilot ten kilohertz tone and generates a control signal 822. The control signal 822 comprises a logic signal that is logic "0" (about zero volts) when the pilot tone is detected and logic "1" (about five volts) otherwise.

In a preferred embodiment, the tone detector 821 comprises a phase locked loop type tone detector, such as the NE567 product made by Philips.

The control signal 822, at an output node 823 of the tone detector 821, is coupled to an inverter 831, which generates a tone logic signal 832. The tone logic signal 832 comprises a logical signal that is the logical inverse of the control signal 822; it is logic "1" when the pilot tone is detected and logic "0" otherwise. The inverter 831 comprises a transistor configured as an inverting amplifier.

The tone logic signal 832, at an output node 833 of the inverter 831, is coupled to a square wave generator 841 at a supply voltage input 842. The square wave generator 841 generates a square wave when the tone logic signal 832 is logic "1" and a logic "0" signal when the tone logic signal 832 is logic "0".

In a preferred embodiment, the square wave generator 841 comprises an astable multivibrator, such as the NE555 product made by Philips.

An output node 843 of the square wave generator 841 is coupled to a retriggerable one-shot 851 at an input node 852; the one-shot 851 generates a logic "1" pulse whenever its input node 852 becomes logic "1". In a preferred embodiment, the one-shot 851 comprises a retriggerable monostable multivibrator, such as the CD748C4538 product made by Harris, with a time constant of about five seconds.

An output node 853 of the one-shot 851 is coupled to a level converter 861, which generates a +12 volt output signal when its input is logic "1". An output node 862 of the level converter 861 is coupled to a "RECORD MODE" input 863 of the recording device 117, for placing the recording device 117 in a recording mode.

Alternative Embodiments

Although preferred embodiments are disclosed herein, many variations are possible which remain within the concept, scope, and spirit of the invention, and these variations would become clear to those skilled in the art after perusal of this application.

I claim:

1. A personal surveillance system, comprising
   a video camera and a microphone integrated into a single audio/video package;
   a transmitter package, physically separated from said audio/video package, said transmitter package having a transmitter capable of transmitting an audio and video signal to a remote station;
   an electrical link coupled to said audio/video package and to said transmitter package, said link disposed to couple an audio signal and a video signal from said audio/video package to said transmitter package;
   wherein said transmitter package comprises
     a control circuit responsive to an operator control and generating a control signal;
     a modulator circuit coupled to said video camera and to said microphone, said modulator circuit generating a modulated signal comprising a video signal and an audio signal;
     said modulated signal comprising said control signal continuously superposed on a part of said modulated signal having a video or an audio signal;
     an antenna; and
     an amplifier coupled to said modulator circuit and to said antenna;
   wherein said control signal comprises a continuous audio tone having substantially a single frequency above a normal range for audio transmission.

2. A system as in claim 1, wherein said transmitter package is configured to be disposed on a second article of clothing.

3. A personal surveillance system, comprising
   an integrated audio/video package having a video camera and a microphone, said audio/video package comprising means for disposing on an article of clothing and for rapidly detaching therefrom;
   a transmitter package, physically separated from said audio/video package, said transmitter package having a transmitter capable of transmitting an audio/video signal to a remote station, said audio/video signal comprising a control signal representing an instruction to said remote station to record said audio/video signal;
   an electrical link coupled to said audio/video package and to said transmitter package, said link disposed to couple an audio signal and a video signal from said audio/video package to said transmitter package;
   a remote station having a recording device and a control circuit coupled to said recording device, said control circuit being responsive to said control signal to record at least a part of said audio/visual signal substantially only when said control signal is present;
   comprising means for directing said recording device to continue recording despite a momentary loss of said control signal.

4. A system as in claim 3, wherein said audio/video package is less than a height of about 2 inches, a length of about 2 inches, and a thickness of about 1.5 inches in size.

5. A personal surveillance system, comprising
   an integrated audio/video package having a video camera and a microphone, said audio/video package comprising means for disposing on an article of clothing and for rapidly detaching therefrom;
   a transmitter package, physically separated from said audio/video package, said transmitter package having a transmitter capable of transmitting an audio/video signal to a remote station, said audio/video signal comprising a control signal representing an instruction to said remote station to record said audio/video signal;
   an electrical link coupled to said audio/video package and to said transmitter package, said link disposed to couple an audio signal and a video signal from said audio/video package to said transmitter package;
   a remote station having a recording device and a control circuit coupled to said recording device, said control circuit being responsive to said control signal to record at least a part of said audio/visual signal substantially only when said control signal is present;
   wherein said control signal comprises a continuous signal having a first value that is present during substantially all times said remote station records said audio/video signal, and having a second value that is present during substantially all other times.

6. A personal surveillance system, comprising
   an integrated audio/video package having a video camera and a microphone, said audio/video package comprising means for disposing on an article of clothing and for rapidly detaching therefrom;
   a transmitter package, physically separated from said audio/video package, said transmitter package having a transmitter capable of transmitting an audio/video signal to a remote station, said audio/video signal comprising a control signal representing an instruction to said remote station to record said audio/video signal;
   an electrical link coupled to said audio/video package and to said transmitter package, said link disposed to couple an audio signal and a video signal from said audio/video package to said transmitter package;
   a remote station having a recording device and a control circuit coupled to said recording device, said control circuit being responsive to said control signal to record at least a part of said audio/visual signal substantially only when said control signal is present;
   wherein said control signal comprises a selected frequency component.

7. A personal surveillance system, comprising
   an integrated audio/video package having a video camera and a microphone, said audio/video package comprising means for disposing on an article of clothing and for rapidly detaching therefrom;
   a transmitter package, physically separated from said audio/video package, said transmitter package having a transmitter capable of transmitting an audio/video signal to a remote station, said audio/video signal comprising a control signal representing an instruction to said remote station to record said audio/video signal;

an electrical link coupled to said audio/video package and to said transmitter package, said link disposed to couple an audio signal and a video signal from said audio/video package to said transmitter package;

a remote station having a recording device and a control circuit coupled to said recording device, said control circuit being responsive to said control signal to record at least a part of said audio/visual signal substantially only when said control signal is present;

wherein said control signal comprises an audio frequency component beyond a frequency required for communication.

8. A personal surveillance system, comprising an integrated audio/video package having a video camera and a microphone, said audio/video package comprising means for disposing on an article of clothing and for rapidly detaching therefrom;

a transmitter package, physically separated from said audio/video package, said transmitter package having a transmitter capable of transmitting an audio/video signal to a remote station, said audio/video signal comprising control signal representing an instruction to said remote station to record said audio/video signal;

an electrical link coupled to said audio/video package and to said transmitter package, said link disposed to couple an audio signal and a video signal from said audio/video package to said transmitter package;

a remote station having a recording device and a control circuit coupled to said recording device, said control circuit being responsive to said control signal to record at least a part of said audio/visual signal substantially only when said control signal is present; wherein said control signal comprises an audio or video signal; and said control circuit at said remote station removes said control signal from said audio/video signal before said audio/video signal is coupled to said video cassette recorder.

9. A personal surveillance system, comprising an integrated audio/video package having a video camera and a microphone, said audio/video package comprising means for disposing on an article of clothing and for rapidly detaching therefrom;

a transmitter package, physically separated from said audio/video package, said transmitter package having a transmitter capable of transmitting an audio/video signal to a remote station, said audio/video signal comprising a control signal representing an instruction to said remote station to record said audio/video signal;

an electrical link coupled to said audio/video package and to said transmitter package, said link disposed to couple an audio signal and a video signal from said audio/video package to said transmitter package;

a remote station having a recording device and a control circuit coupled to said recording device, said control circuit being responsive to said control signal to record at least a part of said audio/visual signal substantially only when said control signal is present; wherein said control signal comprises an audio or video signal; and said control circuit at said remote station removes said control signal from said audio/video signal before said audio/video signal is coupled to said video cassette recorder.

10. A personal surveillance system, comprising an integrated audio/video package having a video camera and a microphone, said audio/video package comprising means for disposing on an article of clothing and for rapidly detaching therefrom;

a transmitter package, physically Separated from said audio/video package, said transmitter package having a transmitter capable of transmitting an audio/video signal to a remote station, said audio/video signal comprising a control signal representing an instruction to said remote station to record said audio/video signal;

an electrical link coupled to said audio/video package and to said transmitter package, said link disposed to couple an audio signal and a video signal from said audio/video package to said transmitter package;

a remote station having a recording device and a control circuit coupled to said recording device, said control circuit being responsive to said control signal to record at least a part of said audio/visual signal substantially only when said control signal is present;

wherein said control circuit operates to direct said recording device to record said audio/video signal whenever said control signal is present and for a selected duration thereafter.

\* \* \* \* \*

UNITED STATES PATENT AND TRADEMARK OFFICE
CERTIFICATE OF CORRECTION

PATENT NO. : 5,594,498
DATED : January 14, 1997
INVENTOR(S) : Walter C. Fraley

It is certified that error appears in the above-indentified patent and that said Letters Patent is hereby corrected as shown below:

---In the "U.S. Patent Documents" section, insert --4,949,186  8/1990 Peterson 358/335--.

---In Column 2, line 36, after "provide" delete "vide ".

---In Column 5, line 66, after "for" insert --a--.

---In Column 7, line 65, replace "controll" with --controlled--.

---In Column 14, line 25, replace "Separated" with --separated--.

Signed and Sealed this

Eighth Day of April, 1997

*Attest:*

BRUCE LEHMAN

*Attesting Officer*     *Commissioner of Patents and Trademarks*